United States Patent [19]

Humphrey et al.

[11] 3,739,253

[45] June 12, 1973

[54] DISPLACED WAVEFORM FOR A PULSE WIDTH MODULATED POWER SOURCE

[75] Inventors: Andrew J. Humphrey, Cleveland; Dennis L. Szymanski, Willoughby, both of Ohio

[73] Assignee: Reliance Electric Company, Cleveland, Ohio

[22] Filed: Oct. 12, 1971

[21] Appl. No.: 188,037

[52] U.S. Cl............................................. 321/9 A
[51] Int. Cl................................................ H02m 1/12
[58] Field of Search................................... 321/9 A

[56] References Cited
UNITED STATES PATENTS

| | | | |
|---|---|---|---|
| 3,662,247 | 5/1972 | Schieman | 321/9 A |
| 3,324,376 | 6/1967 | Hunt | 321/9 A |
| 3,445,742 | 5/1969 | Moscardi | 321/9 A |
| 3,614,590 | 10/1971 | Kernick | 321/9 A |

OTHER PUBLICATIONS

"Power Inverters and Converters," Benjamin Barron, Electronics World, April, 1968, pp. 57-60.

Primary Examiner—William M. Shoop, Jr.
Attorney—George V. Woodling, Bruce B. Krost and Louis V. Granger et al.

[57] ABSTRACT

A pulse width modulated power source is disclosed capable of producing a displaced waveform which has a fixed RMS value and a variable ratio of fundamental to harmonic component. The displaced waveform has reduced harmonics which produce a higher fundamental component than was found in the prior art modulated waveforms. The displaced waveform is suitable for use as an intermediate waveform between a modulated and an unmodulated six-step waveform to overcome surges experienced in the transition therebetween. The foregoing abstract is merely a resume of one general application, is not a complete discussion of all principles of operation or applications, and is not to be construed as a limitation on the scope of the claimed subject matter.

23 Claims, 8 Drawing Figures

DISPLACED WAVEFORM FOR A PULSE WIDTH MODULATED POWER SOURCE

BACKGROUND OF THE INVENTION

The disclosed invention relates to power sources and more particularly to power sources incorporating pulse width modulation to accommodate for the changes in power to a load.

The prior art has known many types of pulse width modulated power sources capable of producing various modulated waveforms. In three-phase pulse width modulated power sources, the most basic waveform is the six-step modulated waveform which produced power to the load during the entire 360° of the load waveform. If the power to the load was to be reduced, then the waveform would be modulated by inserting a notch within the plus and minus half cycles of the load terminal voltage waveshape which would result in a single or a plurality of notches in the line-to-line voltage waveform and the load voltage waveform. One of the primary difficulties of the modulation of the six-step waveform was that the minimum notch width is limited to a finite duration which is determined by the switching time of the switches used. Presently, the art of pulse width modulated power sources is incorporating thyristors as switches which have circuit reset times on the order of 300 to 1,000 microseconds. The minimum notch width of the modulated six-step waveform produces a surge through the load during transitions between the modulated and unmodulated six-step waveform. This surge is objectionable in most applications such as power sources or inverters for elevators, street cars, winding machines and the like. Therefore, an object of this invention is to produce a pulse width modulated power source which eliminates the surge experienced during transitions from a modulated six-step waveform to an unmodulated six-step waveform.

Another object of this invention is to produce a pulse width modulated power source having reduced odd harmonics.

Another object of this invention is to produce a pulse width modulated power source capable of producing a line-to-line displaced waveform having a constant root mean square value yet with a variable fundamental component.

Another object of this invention is to produce a pulse width modulated power source having a line-to-line waveform with a root mean square value equal to an unmodulated waveform.

Another object of this invention is to produce a pulse width modulated power source capable of producing a displaced waveform which can be used as an intermediate waveform between a modulated an an unmodulated six-step waveform or can be used individually to produce the entire output by varying the fundamental component to vary the power to the load.

Another object of this invention is to produce a pulse width modulated power source suitable for use as a variable frequency inverter.

SUMMARY OF THE INVENTION

The invention may be incorporated in a pulse width modulated power source to power a load having A, B and C load terminals, comprising in combination, a power supply having a first and a second supply terminal, a plurality of switch means, said switch means connecting the A, B and C load terminals to said first and second supply terminals, control means actuating said switch means to produce a waveform between two of the load terminals having an initial, middle and a final voltage pulse in each half cycle thereof, and said initial and final voltage pulses being separated by a 120° duration with said middle voltage pulse occupying a section of said 120° duration.

Other objects and a fuller understanding of the invention may be had by referring to the following description and claims, taken in conjunction with the accompanying drawing.

DESCRIPTION OF THE PREFERRED EMBODIMENT

Figure 1:
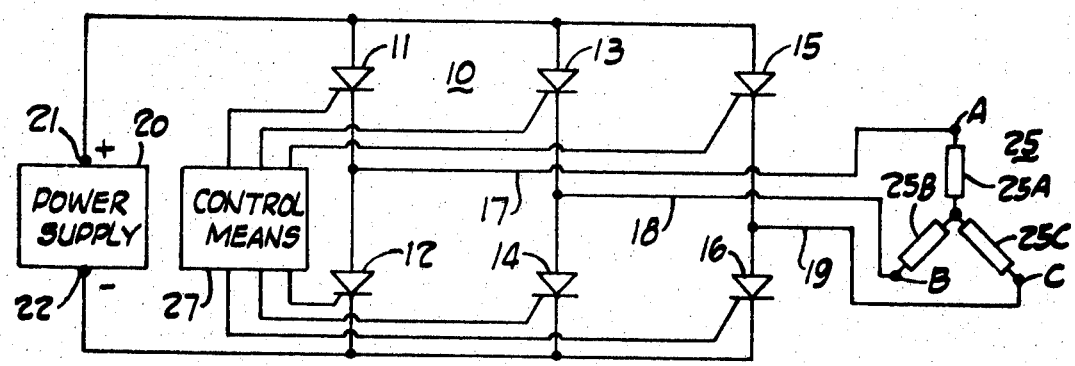
FIG. 1 is the preferred embodiment of the invention showing a pulse width modulated power source.

FIG. 1 illustrates a pulse width modulated power source to power a load 25 having load terminals A, B and C. In this embodiment the load 25 is shown as a three-phase Y load having load windings 25B and 25C. The load is not restricted to a Y load as illustrated in FIG. 1 but can also be a delta load.

The pulse width modulated power source includes a plurality of switch means 10 comprising a first through sixth switch means 11–16, respectively. The pulse width modulated power source is illustrated as a three-phase power source wherein the first and second switch means 11 and 12 comprise phase A, the third and fourth switch means 13 and 14 comprise phase B, and the fifth and sixth switch means 15 and 16 comprise phase C. The pulse width modulated power source includes a power supply 20 having a first and a second supply terminal 21 and 22, respectively. The power supply 20 is a DC power supply wherein the first supply terminal 21 is positive relative to the second supply terminal 22. The switch means 10 connect the A, B and C load terminals to the first and second supply terminals 21 and 22 of the power supply 20. In this embodiment the first and second switch means 11 and 12 are connected in series between the first and second supply terminals 21 and 22, the third and fourth switch means 13 and 14 are connected in series between the first and second supply terminals 21 and 22 and the fifth and sixth switch means 15 and 16 are connected in series between the first and second supply terminals 21 and 22 of the power supply 20. FIG. 1 also illustrates means 17 connecting the first and second switch means 11 and 12 to the load terminal A, means 18 connecting the third and fourth switch means 13 and 14 to the load terminal B and means 19 connecting the fifth and sixth switch means 15 and 16 to the load terminal C.

The pulse width modulated power source includes control means 27 to actuate the switch means 10 and to supply potential from the first and second supply terminals 21 and 22 to each of the A, B and C load terminals. In this illustration, the switch means 10 are illustrated as thyristors in which the gates thereof are connected to the control means 27 to control the conduction of these solid state switching devices. Although thyristors are illustrated as the switch means 10 in this embodiment, any device which functions as a switch and can be controled is within the definition of switch means used in this specification.

Figure 2:
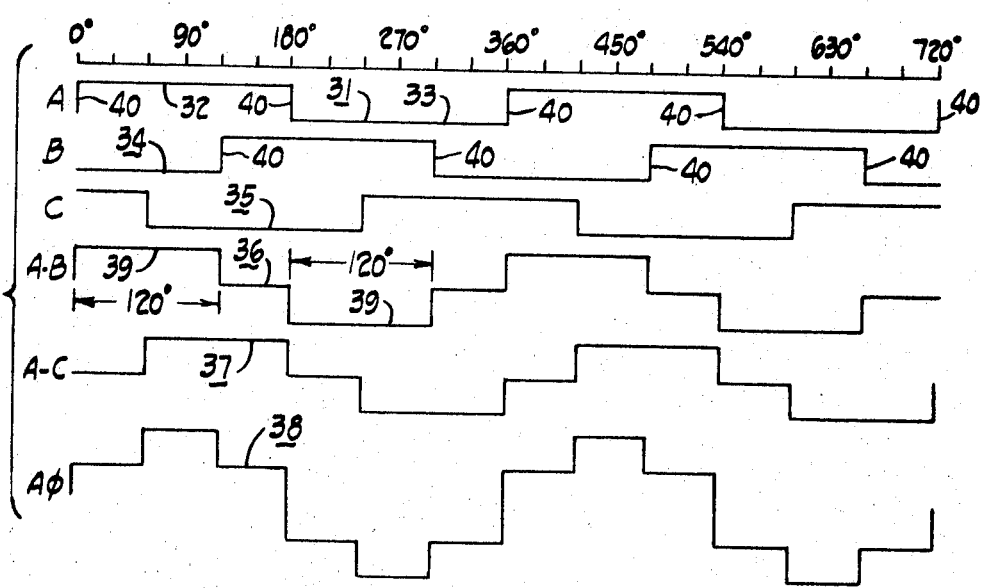
FIG. 2 shows a series of waveshapes and waveforms generated by the pulse width modulated power source shown in FIG. 1 which are unmodulated or unnotched.

FIG. 2 illustrates the various waveshapes and waveforms that are present at the load 25 when the control means 27 actuates the switch means 10 to produce an unmodulated six-step waveform which is known to the prior art. The first and second switch means 11 and 12 determine the potential which is applied to terminal A of the load 25. FIG. 2A illustrates a waveshape 31 which is applied to terminal A. In the first half cycle 32, zero degrees to 180°, the first switch means 11 is conducting and the second switch means 12 is non-conducting thus applying the potential of the first supply terminal 21 to load terminal A. During the second half cycle 33, 180° to 360°, the first switch means 11 is non-conducting and the second switch means 12 is conducting, thus applying the potential of the second supply terminal 22 to the load terminal A. The sequence is repeated for the second cycle which occurs between 360° and 720°. Half cycle reversal in potential 40 occurs every 180°. A waveshape 34 that is applied to the load terminal B is determined by the conducting and non-conducting states of the third and the fourth switch means 13 and 14. FIG. 2B illustrates that the third and fourth switch means 13 and 14 alternate in conductivity between the half cycle reversals 40 to apply the potential of the first and second supply terminals 21 and 22, respectively, to the load terminal B. The waveshape 34 is identical to waveshape 33 but is lagging the waveshape 33 by 120°. The waveshape 35 which is applied to load terminal C is determined by the conduction and non-conduction state of the fifth and sixth switch means 15 and 16. The waveshape 35 as illustrated in FIG. 2C is identical to the waveshape 31 but is lagging the waveshape 31 by 240°. FIG. 2A-B illustrates a waveform 36 of voltage which appears between the A and the B load terminals. FIG. 2A-C illustrates a waveform 37 of voltage which appears between the load terminals A and C. The A-B waveform 36 and the A-C waveform 37 are referred to as line-to-line voltages. The output voltage of the line-to-line voltage waveforms is contained in a region 39 of a half cycle having a duration of 120° as shown in FIG. 2A-B. The sum of waveform 36 and waveform 37 result in a waveform 38 which appears in the load winding 25A. The waveform 38 is generally referred to as a phase-to-neutral waveform. A similar waveform exists for the phase B load winding 25B and the phase C load winding 25C.

Figure 3:
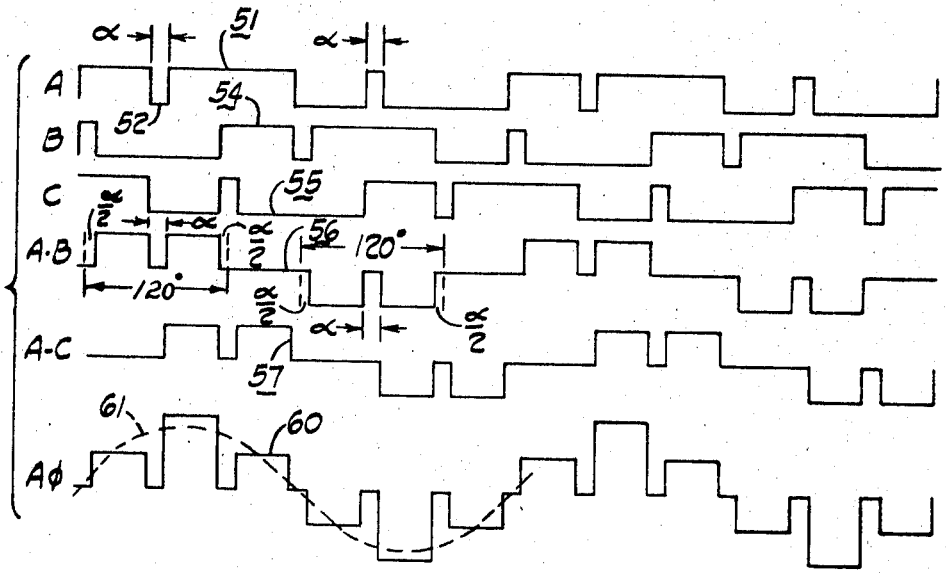
FIG. 3 illustrates waveshapes and waveforms produced by a pulse width modulated power source which are modulated or notched.

The A to neutral waveform 38 is shown in FIG. 2A$\phi$ is a six-step waveform and is produced by having a maximum duration of 180° of potential applied to each of the A, B and C load terminals as shown in FIG. 2A, B and C. If a reduced output is desired a notched or a modulated potential is applied to the load terminals A, B and C as illustrated in FIG. 3. This method of reducing output is known to the prior art and includes notching each half cycle of the waveshape applied to each of the A, B and C load terminals as shown in waveshapes 51, 54 and 55 in FIG. 3A, 3B and 3C, respectively. The notch can be taken out in various positions within the half cycle of the waveshape but in FIG. 3 the notch is taken out in such a manner as to produce a single notch in the line-to-line waveforms 56 and 57 illustrated by FIG. 3A-B and FIG. 3A-C. A single notch having a width $\alpha$ produces a waveform 56 between the A and B load terminals as shown in FIG. 3A-B which has a single notch of width $\alpha$ and a loss of an amount $\alpha/2$ off each end of the 120° region of conduction. For example, waveform 36 shown in FIG. 2A-B has a duration of conduction of 120°. The notch as illustrated in FIG. 3A has a duration $\alpha$ which is approximately 15°. The duration in which the waveform 56 in FIG. 3A-B has an output is equal to approximately 90°, i.e., 45° of output followed by a 15° notch plus 45° of output, resulting in a loss in duration of the output equal to 2$\alpha$. This loss is also true in waveform 57 between the load terminals A and C as illustrated in FIG. 3A-C and is also true for a waveform between load terminals B and C which is not shown. FIG. 3A$\phi$ shows a waveform 60 which is the phase-to-neutral waveform which occurs in load winding 25A. The output of waveform 60 is reduced 3$\alpha$ per half cycle relative to the unmodulated waveform 38.

Therefore, in the prior art method of modulation, a notch of width $\alpha$ per half cycle would produce a line-to-line output having a duration of the maximum 120° minus 2$\alpha$. The pulse width modulated power sources of the prior art typically used thyristors as switch means which have commutation circuit reset times in the inverter and hence a minimum $\alpha$ of 300 to 1,000 microseconds. Therefore, in transitions from the notched waveforms FIG. 3 to the unnotched waveform FIG. 2 a surge would be experienced due to the change in waveform and the associated change in power to the load 25. If the notch width $\alpha$ could be reduced to a notch having an infinitesimal duration, then the transition between the modulated waveform and the unmodulated waveform would be smooth. However, the state of the art in solid state switching devices has limited the commutation time of such devices and consequently has introduced this problem into the art of pulse width modulated power sources.

Figure 4:
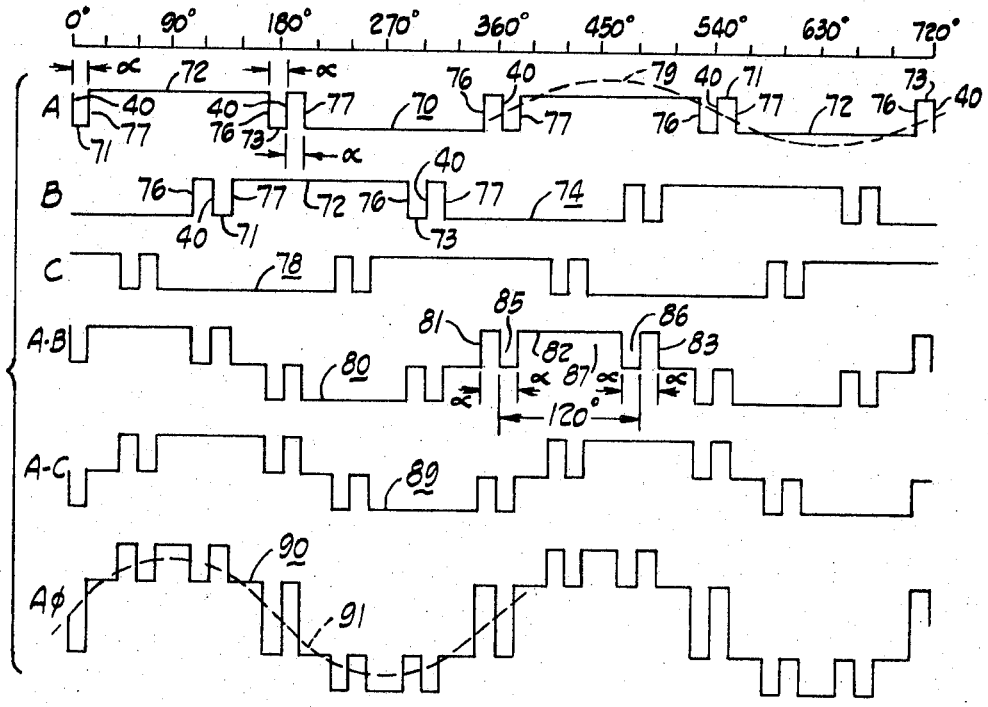
FIG. 4 shows the displaced waveform and associated waveshapes generated in accordance with the disclosed invention by the pulse width modulated power source illustrated in FIG. 1.

FIG. 4 shows the waveshapes and waveforms produced by the pulse width modulated power source shown in FIG. 1 in accordance with the disclosed invention. FIG. 4A illustrates a waveshape 70 which is applied to the load terminal A by the first and second switch means 11 and 12 controled by the control means 27. The waveshape 70 has an initial portion 71, a middle portion 72 and a final portion 73 in each half cycle of the waveshape. The initial and final portions 71 and 73 are at a different potential than the middle portion 72 in each half cycle of waveshape 70. The waveshape 74 that is applied to load terminal B is illustrated in FIG. 4B and is identical to the waveshape 70 but is lagging the waveshape 70 by 120°. Similarly, the waveshape 78 that is applied to load terminal C is illustrated in FIG. 4C and is identical to the waveshapes 70 and 74 but is lagging the waveshape 70 by 240°. The waveshapes shown in FIG. 4A, 4B and 4C can also be considered to comprise half cycle reversals 40 occurring every 180° preceded by a prehalf cycle reversal 76 and followed by a posthalf cycle reversal 77. This may be better observed when compared with the zero crossing points or half cycle reversal points 40 of a sine wave 79 which illustrates the fundamental frequency component of the waveshape 70. For the waveshape 70 the half cycle reversals 40 occur at 0°, 180°, 360°, 540° and 720°. The prehalf cycle reversals 76 and the posthalf cycle reversals 77 occur in such a way that the duration between the prehalf cycle reversal 76 and the half cycle reversal 40 is substantially equal to the duration between the half cycle reversal 40 and the posthalf cycle reversal 77. This is equivalent to stating that the initial portions 71 are substantially equal to the final portions 73 for a given waveshape. The waveshapes 70, 74 and 78 have an initial 71 and final portion 73 which are different in potential from the middle portion 72 and have a duration which is less than the middle portion 72 in each half cycle in the waveshape. The initial and final portions 71 and 73 in the waveshapes 70, 74 and 78 are illustrated as having a duration equal to $\alpha$ in order that the prior art waveshapes and waveforms in FIG. 3 can readily be compared with the waveshapes and waveforms shown in FIG. 4.

FIG. 4A-B shows a displaced waveform 80 which occurs between the load terminals A and B of the load 25. The displaced waveform 80 includes an initial voltage pulse 81, a middle voltage pulse 82 and a final voltage pulse 83. The middle voltage pulse 82 symmetrically occupies a middle section 87 of a 120° duration with end sections 85 and 86 comprising the remainder of the 120° duration. The initial and final voltage pulses 81 and 83 occur outside of the 120° duration resulting in an output which has a duration greater than 120°. The initial and final portions 71 and 73 of the waveshapes 70 and 74 cause the output in the end sections 85 and 86 of waveform 80 to be displaced to form the initial and final voltage pulses 81 and 83, respectively. Thus within a range of $\alpha$, the initial voltage pulse 81 is always equal in time duration to the end section 85 and the final voltage pulse 83 is always equal in duration to the end section 86. In the prior art notched waveform and waveshapes shown in FIG. 3 the line-to-line voltage waveforms 56 and 57 lost an output duration of $2\alpha$ when a notch of $\alpha$ was placed in each half cycle of the waveshapes 51, 54 and 55. However, the displaced voltage waveform 80 shown in FIG. 4A-B includes a 15° initial voltage pulse 81 followed by a 15° notch which is the end section 85, a 90° middle voltage pulse 82 followed by a 15° notch which is end section 86 and a 15° final voltage pulse 83. The output of the line-to-line voltage waveforms 80 and 89 shown in FIG. 4A-B and 4A-C equals the sum of the initial, middle and final voltage pulses 81, 82 and 83 and is equal to 120°. Whereas the prior art notching of the waveshapes 51, 54 and 55 with a 15° notch produced line-to-line voltage waveforms 56 and 57 having a root means square output reduced from a 120° duration to a 90° duration, the invention shown in FIG. 4 utilizes two notches, an initial and final portion 71 and 73 to produce a line-to-line voltage waveform 80 and 89 having the same root mean square output as the unmodulated waveforms 36 and 37 shown in FIG. 2. This is accomplished by displacing the output in the sections 85 and 86 outside the 120° duration forming the initial and final voltage pulses 81 and 83.

The line-to-line voltage waveform 89 shown in FIG. 4A-C is identical to the waveform 80 except the waveform 89 is phase-shifted 60° relative to the waveform 80. The sum of the waveforms 80 and 89 produce the phase-to-neutral waveform 90 of FIG. 4A$\phi$ which occurs in the load winding 25A. Whereas, the middle or intermediate portion 52 of waveshape 51 shown in FIG. 3A is opposite in polarity to the fundamental component 61 of the phase-to-neutral waveforms 60, the middle portion 72 in FIG. 4A is identical in polarity to the fundamental component 91 of the phase-to-neutral waveform 90. In a Y load as illustrated in FIG. 1, the phase-to-neutral voltage is representative of the waveform occurring within the load whereas in a delta load the line-to-line waveform is representative of the load waveform. This comparison of the middle portions of waveshape 70 with the prior art waveshape 51 also follows when compared to the respective fundamental component of the line-to-line voltage waveforms 80 and 89 in FIGS. 3A-B and FIGS. 3A-C and FIG. 4A-B and FIG. A-C.

Figure 5:
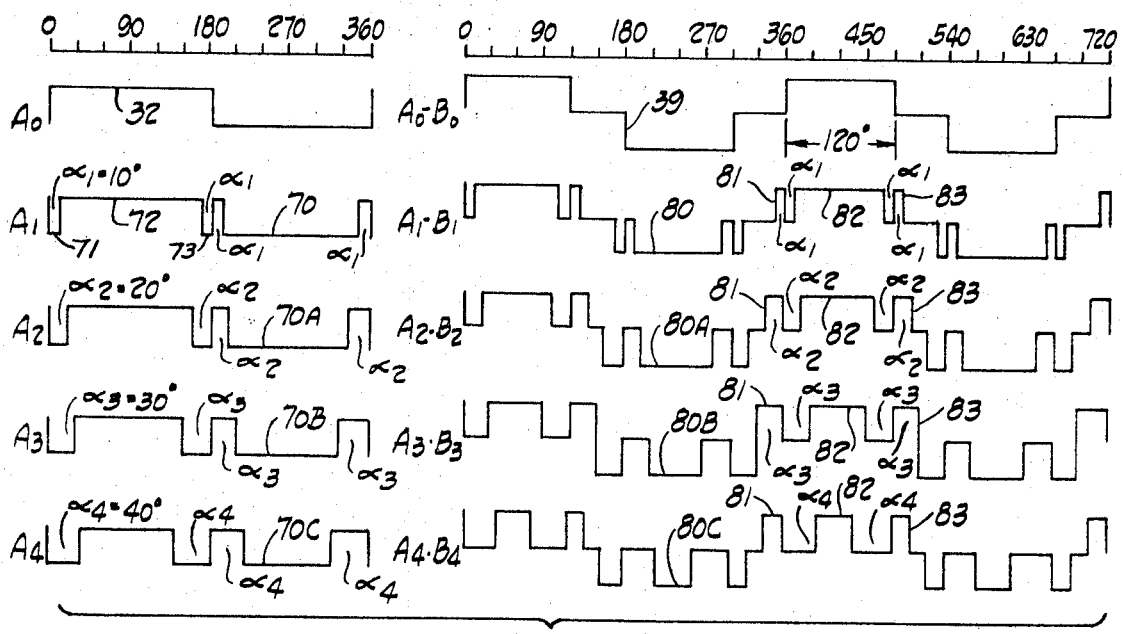
FIG. 5 illustrates the waveshape shown in FIG. 4A with various notch widths and the corresponding displaced waveform shown in FIG. 4 A–B.

FIG. 5 illustrates the waveshape 70 present at the A load terminal with various durations of initial and final portions 71 and 73 and the corresponding waveform 80 present between the A and B load terminals of the load 25. FIG. 5$A_0$ is the unmodulated waveshape 32 having no notches which produce a line-to-line waveform 39, $A_0$-$B_0$ having an output per half cycle of an uninterrupted 120° duration. FIG. 5 $A_1$ has a waveshape 70 with an initial and final portion in each half cycle equal to $\alpha 1$ which is equal to 10°. The corresponding line-to-line waveform 80 is illustrated as $A_1$-$B_1$ producing an initial, middle and final voltage pulse whose sum is 120° and in which the initial and final voltage pulses 81 and 83 are outside of the 120° duration. FIG. 5 $A_2$ shows a waveshape 70A having an initial and final portion equal to $\alpha 2$ or 20°. The corresponding line-to-line waveform 80A is shown in FIG. 5$A_2$-$B_2$ wherein the initial, middle and final voltage pulses 81, 82 and 83, respectively, have a sum equaling 120°. FIG. 5$A_3$ illustrates the waveshape 70B having an initial and final portion of $\alpha 3$ which equals 30°. The corresponding line-to-line waveform 80B is shown in waveform $A_3$-$B_3$ in which the sum of the initial, middle and the final voltage pulse produces a 120° duration of output. FIG. 5$A_4$ illustrates a waveshape 70C having an initial and final portion equal to $\alpha 4$ which is equal to 40°. The corresponding line-to-line voltage waveform 80C is illustrated by FIG. 5$A_4$-$B_4$ and it should be noted that the sum of the initial voltage pulse 81, the middle voltage pulse 82 and the final voltage pulse 83 is no longer equal to 120°. Therefore, as long as the width of the initial and final portion is each between zero and 30°, the corresponding line-to-line voltage waveform will have a substantially constant root mean square value equal to the unmodulated waveform. When the initial and final portions each equal a duration greater than 30°, the output in the line-to-line voltage waveform is reduced and is no longer substantially constant. A 30° duration in each of the initial and final pulses is equivalent to a 60° duration between the prehalf cycle reversal and a posthalf cycle reversal.

Although changes in $\alpha$ in which $\alpha$ is less than 30° do not change the root mean square of the displaced waveform 80 and 89, these changes in α vary the ratio of fundamental to harmonic component found in the line-to-line voltage waveform 80 and 89 and the waveform 90 delivered to the load 25. Variations in the initial and final portions 71 and 73 of the waveshape 70, 74 and 78 vary the effective power to the load to compensate for changes in the load.

Figure 6:
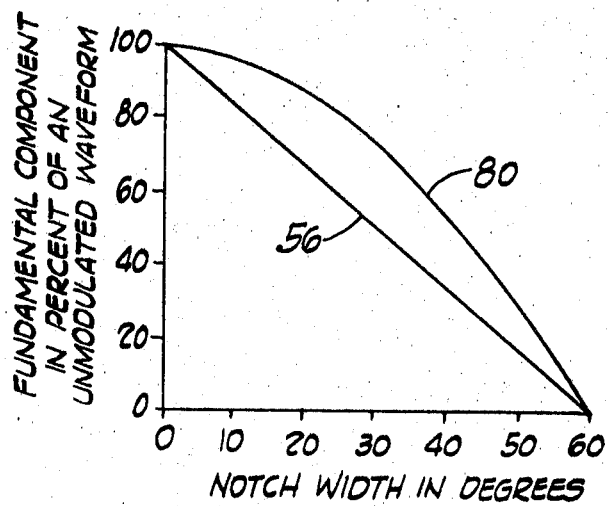
FIG. 6 is a graph illustrating the fundamental output voltage as a function of notch width for the prior art notched waveform shown in FIG. 3 A–B and the displaced waveform shown in FIG. 4 A–B.

FIG. 6 illustrates the fundamental output voltage in per cent of the unmodulated line-to-line waveform 36 as a function of the notch width α in degrees. The displaced waveform 80 shown in FIG. 4A–B has a higher fundamental to harmonic ratio than the prior art waveform 56 shown in FIG. 3A–B. Consequently the fundamental output voltage is higher for any given notch width α in the comparison between the displaced wave 80 and the prior art notched waveform 56. For example, assuming a minimum notch width obtainable at the present art of the solid state switching devices to be 10° for a given frequency, then the load 25 must experience a surge from approximately 83 percent to 100 percent in a transition from the prior art modulated waveform 56 to the unmodulated waveform 36. However, in the displaced waveform 80 disclosed in this invention, a 10° notch width will have a fundamental component of 96.6 percent and only a 3.4 percent surge in fundamental voltage will be experienced in the transition between the displaced waveform 80 to the unmodulated waveform 36. Therefore, the use of the displaced waveform 80 substantially eliminates the surge of 17 percent in fundamental voltage in the transition between the prior art notched waveform 56 to the unnotched waveform 36 and reduces this surge to only 3.4 percent making such a transition smooth and compatible for machines requiring smooth operation with changing loads. A smooth operation is necessary in variable frequency pulse width modulated inverters.

Figure 7:
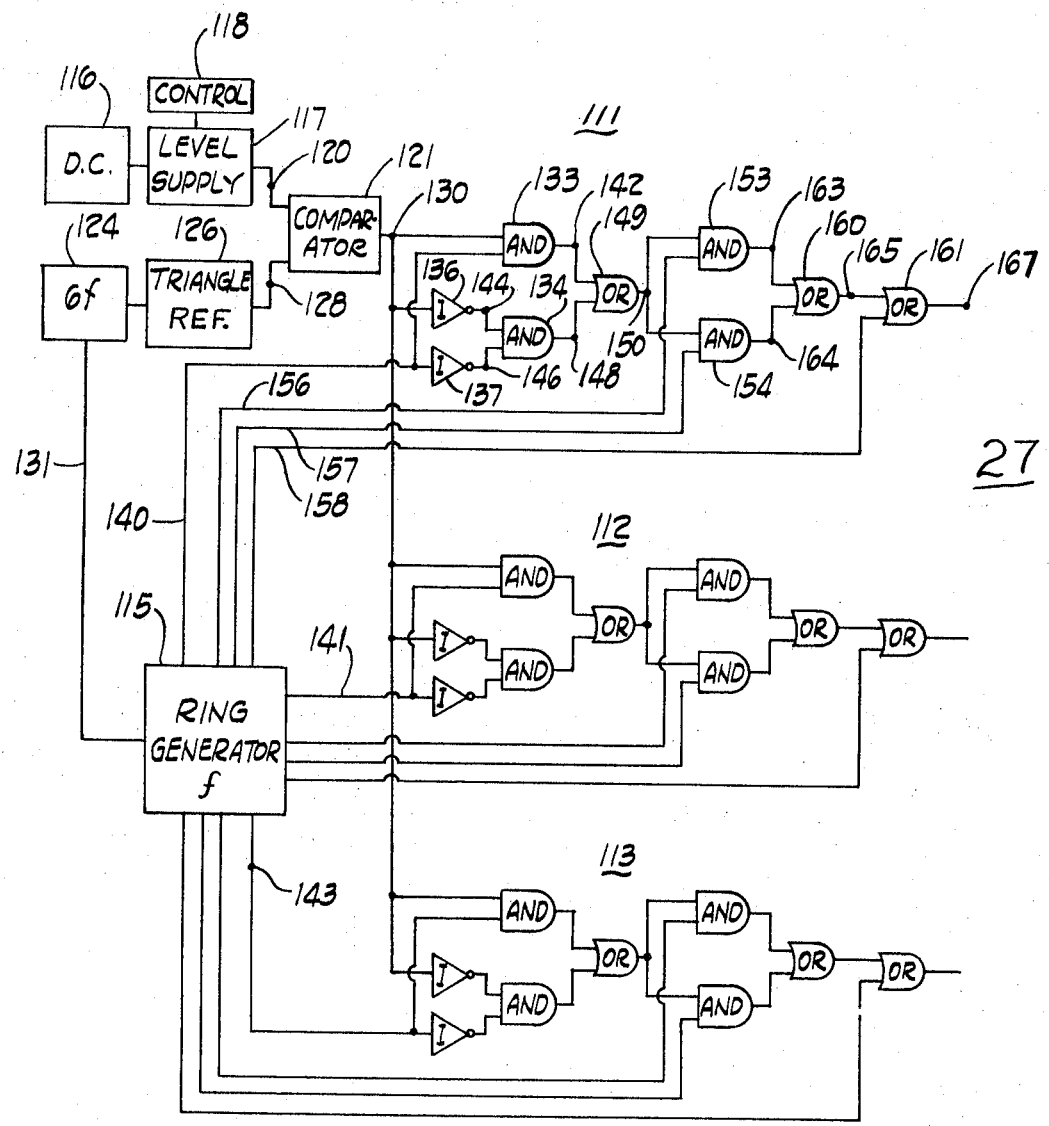
FIG. 7 illustrates control means used to generate the displaced waveform shown in FIG. 4; and, FIG. 8 illustrates the various waveshapes generated by the control means shown in FIG. 7.

FIG. 7 illustrates a portion of the control means 27 used to actuate the switch means 11–16 in FIG. 1. The control means 27 includes a logic section 111 for phase A, a logic section 112 for phase B and a logic section 113 for phase C. Each of these logic sections operates in an identical manner at a phase angle of 120° relative to each other. The operation of the logic section 111 for phase A will be explained making the operation of logic sections 112 and 113 obvious.

A ring generator 115 generates various signals at a fundamental frequency $f$ of the waveshape applied to the A, B and C load terminals of the load 27. The fundamental frequency $f$ of the ring generator 115 is connected through a conductor 131 to a generator 124 which operates at six times the fundamental frequency. Generator 124 is connected to a triangular waveshape generator 126 which has an output at 128 with a waveshape 128A shown in FIG. 8A. A DC supply 116 supplies DC voltage to a level supply 117 which has an output at 120 with a linear waveshape 120A which is shown in FIG. 8A. The relative level of the linear waveshape 120A and the triangular waveshape 128A is variable by a control 118. Waveshapes 120A and 128A are applied to a comparator 121 which has an output 130 with a waveshape 130A shown in FIG. 8B. The relative level of the linear waveshape 120A and the triangular waveshape 128A determines the width 2α of the notches in the waveshape 130A. Waveshape 130A is applied to a terminal of an AND gate 133 and is also applied to an inverter 136. An AND gate produces an output only when a signal is present simultaneously at both inputs. Ring generator 115 has an output 140 with a waveshape 140A, in FIG. 8C, which is applied to the other terminal of the AND gate 133 and is also applied to the inverter 137. Similar waveforms for the B and C phases are generated for the logic sections 112 and 113 on ring generator outputs 141 and 143. The AND gate 133 produces an output at 142 with a waveshape 142A shown in FIG. 8D which is applied to a terminal of an OR gate 149. The waveshape 130A that is applied to the inverter 136 produces an output at 144 with a waveform 144A shown in FIG. 8E. The waveshape 140A that is applied to the inverter 137 produces at output 146 a waveshape 146A as shown in FIG. 8F. The waveshapes 144A and 146A shown in FIGS. 8E and 8F, respectively, are applied to an AND gate 134 producing an output 148 with a waveshape 148A shown in FIG. 8G which is applied to the other terminal of the OR gate 149. The OR gate 149 will produce an output when an input signal is present at any input. The OR gate 149 has an output at 150 with a waveshape 150A shown in FIG. 8H. The waveshape 150A is applied to a terminal of each of the AND gates 153 and 154. Ring generator 115 has an output 156 with a waveshape 156A shown in FIG. 8I applied to the other terminal of the AND gate 153. The waveshape 150A has an output from 30° prior to 30° subsequent of the initiation 170 of the cycle of the fundamental waveshape 140A shown in FIG. 8C. The AND gate 153 with the input waveshapes 150 and 156 has an output 163 with a waveshape 163A which is applied to a terminal of an OR gate 160. A waveshape 157A produced by an output 157 of the ring generator 115 is applied to the other terminal of the AND gate 154. The waveshape 157A has a 60° output duration symmetrically distributed about the half cycle reversal 171 of the fundamental waveform 140A shown in FIG. 8C. The AND gate 154 with the input waveshapes 150 and 157 produces an output at 164 with a waveshape 164A shown in FIG. 8L. The waveshape 164A is applied to the other terminal of the OR gate 160 to produce an output at 165 with a waveshape 165A shown in FIG. 8M. The waveshape 165A is applied to a terminal of an OR gate 161. A ring generator output 158 has a waveshape 158A as shown in FIG. 8N. The waveshape 158A has an output between 30° and 150° relative to the initiation of the cycle 170 of the fundamental waveshape 140A shown in FIG. 8C. The OR gate 161 having input waveshapes 165A and 158A has an output 167 with the final waveshape 167A shown in FIG. 8O which is the waveshape 70 shown in FIG. 4A. The height of the linear waveshape 120 relative to the triangular waveshape 128 determines the width of the initial and final portions of the waveshape 167A. A notch of width 2α in waveshape 130A produces a waveshape 167A having an initial and a final portion each having a duration equal to α. Consequently, the adjustment of control 118 determines the duration of the initial and final portions of the waveshape 167 to vary the magnitude of the fundamental component relative to the harmonic components in the resultant line-to-line waveform.

The phase B and C logic sections 112 and 113, respectively, operate identically to the A logic section 111 and the phase difference of 120° between the A, B and C phases is developed by a 120° phase displacement of the waveshapes generated by the ring generator 115. When the ring generator 115 has a controllable frequency, the power source in FIG. 1 can be used as a variable frequency inverter.

Figure 8:
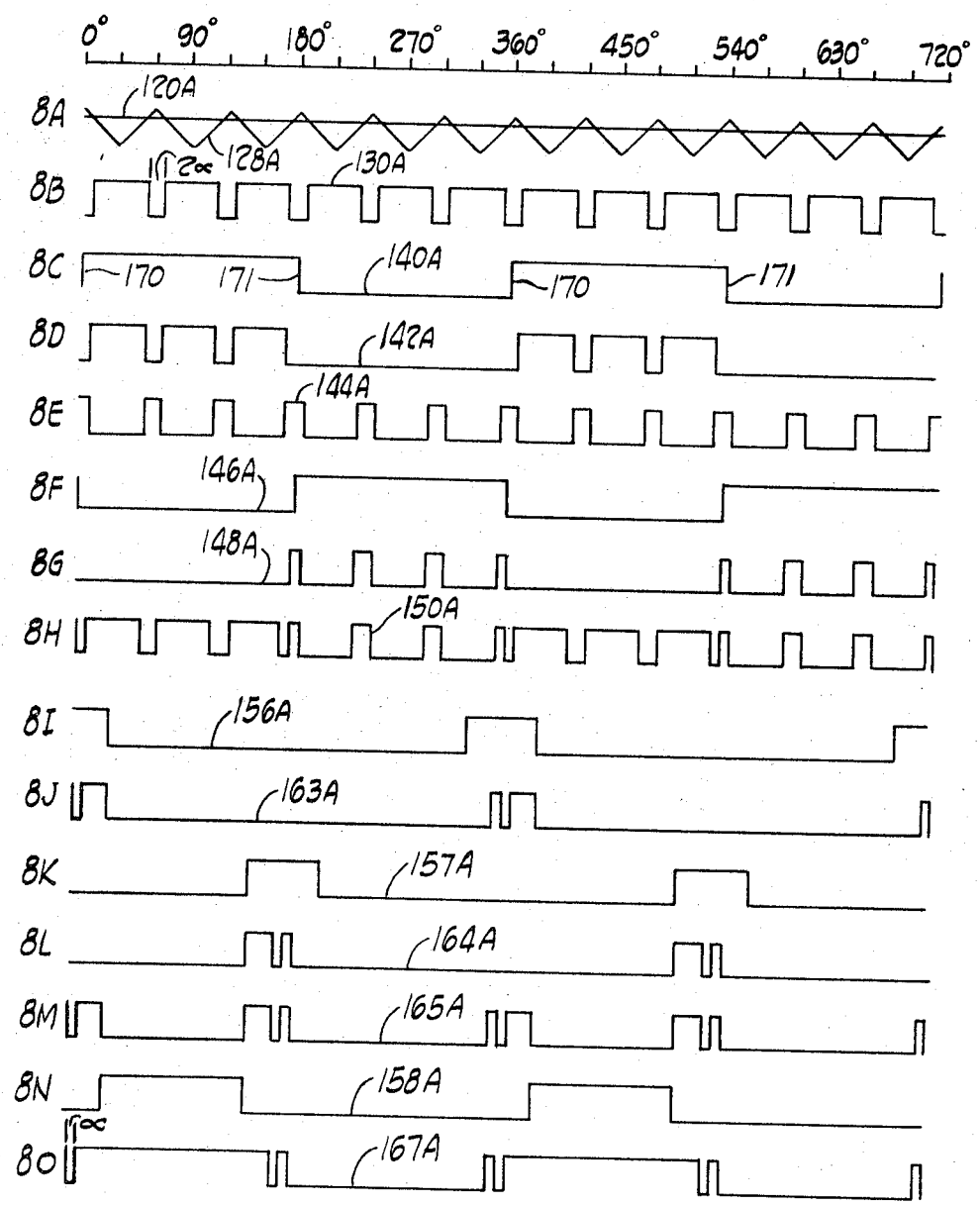

Although FIGS. 7 and 8 have described the control means 27 in a great detail of particularity, it should be averted to that there are other variations which can produce the same waveshape 167A shown in FIG. 8O. These variations of circuitry to produce the waveshape 167A are included within the definition of control means used in this specification.

The invention heretofore described discloses a novel pulse width modulation power source capable of producing waveforms having a variable fundamental component with a constant root means square value. The root means square value of the line-to-line displaced waveform has a value equal to the unmodulated waveform known to the prior art. Since the displaced waveform reduces many of the unwanted harmonics present in the prior art notched waveforms, the displaced waveform has a higher fundamental to harmonic component ratio for a given notch width and is capable of being used as an intermediate waveform between an unnotched and a notched six-step waveform to eliminate the surges in the load experienced in transitions therebetween. The displaced waveform can also be used by itself to produce an output having a variable fundamental component to vary the power to the load. The waveform is compatable for use in variable frequency inverters.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A pulse width modulated power source to power a load having A, B and C load terminals, comprising in combination,
   a power supply having a first and a second supply term-inal,
   a plurality of switch means,
   said switch means connecting the A, B and C load terminals to said first and second supply terminals,
   control means actuating said switch means to produce a waveform between two of the A, B and C load terminals having an initial, middle and a final voltage pulse in each half cycle thereof,
   and said initial and final voltage pulses being separated by a 120° duration with said middle voltage pulse occupying a portion of said 120° duration.

2. A pulse width modulated power source as set forth in claim 1, wherein said initial voltage pulse is substantially equal in time duration to said final voltage pulse.

3. A pulse width modulated power source as set forth in claim 1, wherein said switch means includes solid state switch means.

4. A pulse width modulated power source as set forth in claim 1, wherein the power source is a three phase variable frequency inverter.

5. A pulse width modulated source as set forth in claim 1, wherein said control means actuates said switch means to produce a waveform between each two of the load terminals having said initial, middle and final voltage pulse in each half cycle thereof.

6. A pulse width modulated power source as set forth in claim 1, wherein said waveform is produced by interacting a reference voltage waveshape and a triangular voltage waveshape.

7. A pulse width modulated power source as set forth in claim 6, wherein said reference voltage waveshape and said triangular voltage waveshape are variable relative to each other to produce a variable fundamental component of said waveform.

8. A pulse width modulated source as set forth in claim 6, wherein said reference voltage has a constant amplitude at least for 180° of the fundamental of the voltage between two of the load terminals.

9. A three phase pulse width modulated power source to power a load having A, B and C load terminals, comprising in combination,
   a power supply having a first and a second supply terminal,
   a plurality of switch means,
   said switch means connecting the A, B and C load terminals to said first and second supply terminals,
   control means actuating said switch means to produce a waveform between two of the load terminals having an initial, middle and a final voltage pulse in each half cycle thereof,
   and said voltage pulses being variable in disposition throughout each half cycle within a range of variation with the sum of the time durations of said voltage pulses being substantially equal to 120°.

10. A pulse width modulated power source as set forth in claim 9, wherein said range of variation of each of said initial and final voltage pulses is approximately 30°.

11. A pulse width modulated power source having phases A, B and C to power a load having A, B and C load terminals, comprising in combination,
   a power supply having a first and a second supply terminal,
   a plurality of switch means,
   said switch means connecting the A, B and C load terminals to said first and second supply terminals,
   control means actuating said switch means to apply a voltage from said power supply between two of the load terminals in a substantially symmetrical waveform having an initial, middle and final pulse in each half cycle of said waveform,
   and said pulses being variable within a range of variation to produce a variable fundamental component with a substantially constant root mean square value for said waveform.

12. A pulse width modulated power source having phases A, B and C to power a load having A, B and C load terminals, comprising in combination,
   a power supply having a first and a second supply terminal,
   a plurality of switch means,
   said switch means connecting the A, B and C load terminals to said first and second supply terminals,
   control means actuating said switch means to apply potential from said power supply to each of the A, B and C load terminals in a substantially symmetrical waveshape having an initial, middle and final portion in each half cycle thereof,
   and said initial and final portions being different in potential from said middle portion in each half cycle and being variable within a range of variation to produce a voltage waveform between two of said load terminals having a variable fundamental component and a substantially constant root mean square value for said waveform.

13. A pulse width modulated power source having phases A, B and C to power a load having load terminals A, B and C, comprising in combination, a power supply having a positive and a negative supply terminal relative to each other, a plurality of switch means, said switch means connecting the A, B and C load terminals to said positive and negative supply terminals, control means actuating said switch means to apply positive and negative potentials from said power supply between two of the A, B and C load terminals in a waveform having an initial, middle and a final voltage pulse in each half cycle thereof, and said middle voltage pulse symmetrically occupying a middle section of a 120° duration with the end sections of said 120° duration displaced without said 120° duration to form said initial and final voltage pulses.

14. A pulse width modulated power source as set forth in claim 13, wherein said initial and final voltage pulses are adjacent to 30° and 150° points, respectively, relative to half cycle points of the fundamental component of said waveform.

15. A three phase pulse width modulated inverter having phases A, B and C to power a load having A, B and C load terminals, comprising in combination, a DC power source having a first and a second supply terminal, first through sixth switch means, said first and second switch means connected in series between said supply terminals, said third and fourth switch means connected in series between said supply terminals, said fifth and sixth switch means connected in series between said supply terminals, means connecting said first and second switch means to load terminal A, means connecting said third and fourth switch means to load terminal B, means connecting said fifth and sixth switch means to load terminal C, control means actuating said switch means to apply a waveform of voltage between two of the A, B and C load terminals having an initial, middle and final voltage pulse in each half cycle thereof, said initial and final voltage pulses being separated by a 120° duration with said middle voltage pulse symmetrically occupying a middle section of said 120° duration, and said voltage pulses being variable within a range of variation with said initial and final voltage pulses being displaced from and equal to the unoccupied end sections of said 120° duration.

16. A pulse width modulated power source having phases A, B and C to power a load having windings A, B and C and load terminals therefor, comprising, in combination, a power supply having a positive and a negative supply terminal relative to each other, a plurality of switch means, said switch means connecting the A, B and C load terminals to said positive and negative supply terminals, control means actuating said switch means to apply positive and negative potentials from said power supply to each of the A, B and C load terminals in a waveshape having an initial, middle and final portion in each half cycle of the waveshape, said initial and final portions being different in polarity from said middle portion in each half cycle of said waveshape, and said middle portion having a polarity identical to the polarity of the fundamental component of the respective load winding waveform.

17. A pulse width modulated power source as set forth in claim 16, wherein said initial and final portions are variable within a range of variation to produce a voltage waveform between two of said load terminals having a variable fundamental component and a substantially constant root mean square value.

18. A pulse width modulated power source as set forth in claim 16, wherein said middle portion has a greater duration than said initial and final portion in each half cycle of said waveshape.

19. A three phase pulse width modulated inverter having a variable fundamental voltage to power a load having load terminals, A, B and C, comprising, in combination, a DC power supply having a positive and a negative terminal relative to each other, pairs of switch means, means connecting said pairs of switch means to said positive and negative terminals from each of the load terminals, control means actuating said switch means to produce polarity reversals at each of the load terminals at substantially 120° phase angles relative to each other, said control means producing half cycle reversals at each half cycle of the respective fundamental component, and said control means establishing a prehalf cycle and a posthalf cycle polarity reversal which are variable in duration before and after said half cycle reversals to produce a waveform between two of said load terminals having an output which has a duration greater than 120°.

20. A three phase pulse width modulated inverter as set forth in claim 19, wherein the duration between said half cycle reversal and said prehalf cycle reversal is substantially equal to the duration between said half cycle reversal and said posthalf cycle reversal.

21. A three phase pulse width modulated inverter as set forth in claim 19, wherein the duration between said prehalf cycle reversal and said posthalf cycle reversal is less than 60°.

22. A three phase pulse width modulated inverter as set forth in claim 19, wherein the duration between said prehalf cycle reversal and said posthalf cycle reversal is variable to vary the fundamental component of said waveform.

* * * * *